(12) United States Patent
Chhabra (10) Patent No.: US 10,599,906 B2
(45) Date of Patent: Mar. 24, 2020

(54) FINGERPRINT VERIFICATION DEVICE

(71) Applicant: NXP B.V., Eindhoven (NL)

(72) Inventor: Parikshit Kumar Chhabra, Bangalore (IN)

(73) Assignee: NXP B.V., Eindhoven (NL)

( * ) Notice: Subject to any disclaimer, the term of this patent is extended or adjusted under 35 U.S.C. 154(b) by 146 days.

(21) Appl. No.: 15/881,732

(22) Filed: Jan. 27, 2018

(65) Prior Publication Data

US 2018/0218196 A1    Aug. 2, 2018

(30) Foreign Application Priority Data

Jan. 27, 2017    (EP) .................................... 17153643

(51) Int. Cl.
*G06K 9/00* (2006.01)
*G06K 9/20* (2006.01)

(52) U.S. Cl.
CPC ..... *G06K 9/00026* (2013.01); *G06K 9/00093* (2013.01); *G06K 9/00926* (2013.01); *G06K 9/00986* (2013.01); *G06K 9/2054* (2013.01)

(58) Field of Classification Search
CPC .......... G06K 9/00026; G06K 9/00093; G06K 9/2054; G06K 9/00986; G06K 9/00926
See application file for complete search history.

(56) References Cited

U.S. PATENT DOCUMENTS 9,261,991 B2    2/2016  Alameh et al.
2009/0226052 A1*  9/2009  Fedele ............... G06K 9/00046
                                                    382/125

(Continued)

FOREIGN PATENT DOCUMENTS

CN          101593268 A      12/2009
EP          3 109 793 A1     12/2016
WO          2005/001752 A2    1/2005

OTHER PUBLICATIONS

Petrovska-Delacretaz, D. et al. (eds.) "Guide to Biometric Reference Systems and Performance Evaluation" Springer-Verlag, (2009) pp. 51-90 are provided (of which pp. 59-61 may be most relevant).

(Continued)

*Primary Examiner* — Utpal D Shah (57) ABSTRACT

According to a first aspect of the present disclosure, a fingerprint verification device is provided, comprising a fingerprint image sensor and a processing unit, the fingerprint verification device being configured to operate in a first resolution mode and in a second resolution mode, wherein the first resolution is higher than the second resolution, the fingerprint verification device further being configured to operate in a verification mode in which: the fingerprint image sensor captures a fingerprint image in the second resolution mode and the processing unit processes the captured fingerprint image; the processing unit selects one or more areas of the captured fingerprint image; the fingerprint image sensor recaptures the selected areas in the first resolution mode and the processing unit processes the recaptured selected areas. Furthermore, a corresponding fingerprint verification method is conceived, as well as a corresponding non-transitory machine-readable medium that comprises executable instructions.

18 Claims, 5 Drawing Sheets

(56) References Cited

U.S. PATENT DOCUMENTS

| | | | | |
|---|---|---|---|---|
| 2009/0310831 A1* | 12/2009 | Zhang | ............... | G06K 9/00073 |
| | | | | 382/125 |
| 2010/0046810 A1* | 2/2010 | Yamada | ............. | G06K 9/00026 |
| | | | | 382/124 |
| 2014/0270415 A1* | 9/2014 | Alameh | ............. | G06K 9/00026 |
| | | | | 382/124 |
| 2016/0086024 A1 | 3/2016 | Tsukamoto et al. | | |
| 2016/0246396 A1* | 8/2016 | Dickinson | ........... | G06F 3/03545 |
| 2016/0379037 A1* | 12/2016 | Russo | ............... | G06K 9/00114 |
| | | | | 382/125 |
| 2017/0004341 A1 | 1/2017 | Oreifej et al. | | |

OTHER PUBLICATIONS

Rawat, A. "A Hierarchical Fingerprint Matching System", Thesis, Indian Institute of Techology Kanpur, 99 pgs., retrieved from the internet Jun. 12, 2017 at: URL:https://static.aminer.org/pdf/PDF/000/348/238/fingerprint matching with_rotation_descriptor texture-features~pdf (Jul. 1, 2009).

Pan, S. B. et al. "A Memory-Efficient Fingerprint Verification Algorithm Using a Multi-Resolution Accumulator Array", ETRI Journal, vol. 25, No. 3, pp. 179-186 (Jun. 1, 2003).

Maltoni, D. et al. "A Tutorial on Fingerprint Recognition", Handbook of Fingerprint Recognition, Springer-Verlag, pp. 43-68 retrieved from the internet at: https://pdfs.semanticscholar.org/308a/57d3339e2297cb3709360781f7cff8459ee3.pdf (2003).

Ravi, J. et al. "Fingerprint Recognition Using Minutia Score Matching", International Journal of Engineering Science and Technology, vol. 1(2), pp. 35-42 (2009).

Petrovska-Delacretaz, D. et al. (eds.) "Guide to Biometric Reference Systems and Performance Evaluation" Springer-Verlag, (2009) (Only Abstract Provided).

Extended European Search Report for Patent Appl. No. 17153643.6 (dated Jun. 21, 2017).

* cited by examiner

FINGERPRINT VERIFICATION DEVICE

CROSS-REFERENCE TO RELATED APPLICATIONS

This application claims the priority under 35 U.S.C. § 119 of European patent application no. 17153643.6, filed on Jan. 27, 2017, the contents of which are incorporated by reference herein.

FIELD

The present disclosure relates to a fingerprint verification device. Furthermore, the present disclosure relates to a corresponding fingerprint verification method, and to a corresponding non-transitory machine-readable medium comprising machine-readable instructions.

BACKGROUND

Today, many electronic devices and systems require a form of user authentication. For example, in a payment system, a smart card may be used to initiate a payment and to authenticate a user. In addition to conventional user authentication via a personal identification number (PIN), a smart card may also include a fingerprint verification device for capturing and verifying the user's fingerprint. In that case, the captured fingerprint may be used to ascertain that the smart card is presented to a terminal by its rightful owner, for example.

SUMMARY

According to a first aspect of the present disclosure, a fingerprint verification device is provided, comprising a fingerprint image sensor and a processing unit, the fingerprint verification device being configured to operate in a first resolution mode and in a second resolution mode, wherein the first resolution is higher than the second resolution, the fingerprint verification device further being configured to operate in a verification mode in which: the fingerprint image sensor captures a fingerprint image in the second resolution mode and the processing unit processes the captured fingerprint image; the processing unit selects one or more areas of the captured fingerprint image; the fingerprint image sensor recaptures the selected areas in the first resolution mode and the processing unit processes the recaptured selected areas. In one or more embodiments, the fingerprint verification device is further configured to operate in an enrollment mode in which the fingerprint image sensor captures a reference fingerprint image in the first resolution mode and the processing unit processes the captured reference fingerprint image.

In one or more embodiments, in said enrollment mode, the fingerprint image sensor is further configured to capture a plurality of reference fingerprint images in the first resolution mode, and to merge said reference fingerprint images into a single image. In one or more embodiments, the processing unit is configured to select said areas by identifying fingerprint features in said image and by defining said areas around the identified fingerprint features.

In one or more embodiments, the fingerprint features comprise fingerprint minutiae.

In one or more embodiments, the fingerprint verification device is further configured to operate in a plurality of different second resolution modes.

In one or more embodiments, in the first resolution mode, the fingerprint image sensor is configured to capture individual pixels of a fingerprint image and the processing unit is configured to process the captured individual pixels, and in the second resolution mode, the fingerprint image sensor is configured to capture merged pixels of the fingerprint image and the processing unit is configured to process the captured merged pixels.

In one or more embodiments, processing the individual pixels and processing the merged pixels comprises digital processing.

In one or more embodiments, processing the captured fingerprint image and processing the recaptured selected areas comprises matching said fingerprint image and selected areas against reference data, and the processing unit is further configured to use smaller tolerance boxes for matching the selected areas than for matching the fingerprint image.

In one or more embodiments, a smart card comprises a fingerprint verification device of the kind set forth.

According to a second aspect of the present disclosure, a fingerprint verification method is conceived, using a fingerprint verification device comprising a fingerprint image sensor and a processing unit, the fingerprint verification device being configured to operate in a first resolution mode and in a second resolution mode, wherein the first resolution is higher than the second resolution, wherein, when the fingerprint verification device operates in a verification mode: the fingerprint image sensor captures a fingerprint image in the second resolution mode and the processing unit processes the captured fingerprint image; the processing unit selects one or more areas of the captured fingerprint image; the fingerprint image sensor recaptures the selected areas in the first resolution mode and the processing unit processes the recaptured selected areas.

In one or more embodiments, when the fingerprint verification device operates in an enrollment mode, the fingerprint image sensor captures a reference fingerprint image in the first resolution mode and the processing unit processes the captured reference fingerprint image.

In one or more embodiments, in said enrollment mode, the fingerprint image sensor captures a plurality of reference fingerprint images in the first resolution mode, and merges said reference fingerprint images into a single image.

In one or more embodiments, the processing unit selects said areas by identifying fingerprint features in said fingerprint image and by defining said areas around the identified fingerprint features.

According to a third aspect of the present disclosure, a non-transitory machine-readable medium is provided, comprising computer-executable instructions which, when executed, carry out or control a method of the kind set forth.

BRIEF DESCRIPTION OF THE DRAWINGS

Embodiments will be described in more detail with reference to the appended drawings, in which.

DESCRIPTION OF EMBODIMENTS

As mentioned above, electronic devices such as smart cards may contain embedded fingerprint verification devices. Fingerprint-based user authentication is becoming more popular in many applications like physical access control, mobile devices and smart cards. For definitive matching with a low rate for false matches (False Acceptance Rate, FAR) and false rejections (False Rejection Rate, FRR) it is desirable to have a high resolution, e.g., 500 dpi or higher, for the sensor. However, a high resolution requires a lot of processing power and memory. Although in a mobile device there may be enough processing power, in devices like smart cards there may be a lack of computational resources. When such high resolution is used in hardware-constrained systems it may lead to longer processing times (e.g., the time to process a fingerprint matching request). Some systems try to solve the problem of long matching times and limited resources by using lower resolution fingerprint captures, but this typically results in higher FARs and higher FRRs.

Therefore, according to a first aspect of the present disclosure, a fingerprint verification device is provided, comprising a fingerprint image sensor and a processing unit, the fingerprint verification device being configured to operate in a first resolution mode and in a second resolution mode, wherein the first resolution is higher than the second resolution, the fingerprint verification device further being configured to operate in a verification mode in which: the fingerprint image sensor captures a fingerprint image in the second resolution mode and the processing unit processes the captured fingerprint image; the processing unit selects one or more areas of the captured fingerprint image; the fingerprint image sensor recaptures the selected areas in the first resolution mode and the processing unit processes the recaptured selected areas. In this way, less computational resources are required and power may be saved, while for areas of interest in the fingerprint image, the resolution is still sufficiently high. Thus, a trade-off may be achieved between computational costs (e.g., power consumption and memory size) and system performance (i.e., low FARs and low FRRs).

Figure 1:
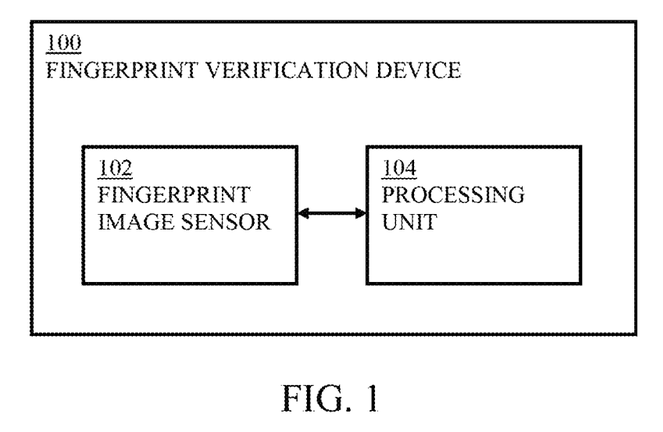
FIG. 1 shows an illustrative embodiment of a fingerprint verification device.

FIG. 1 shows an illustrative embodiment of a fingerprint verification device 100. In this example, the fingerprint verification device 100 comprises a fingerprint image sensor 102 operatively coupled to a processing unit 104. The fingerprint image sensor 102 may be configured to capture a fingerprint image. For example, the fingerprint image sensor 102 may comprise an array of sensor plates configured to capture individual pixels of a fingerprint image through capacitive sensing. Furthermore, the fingerprint image sensor 102 may be configured to provide individual pixel values to the processing unit 104. The processing unit 104, in turn, may be configured to perform processing functions on the pixel values, for example with the purpose to create a live fingerprint image template that can be matched against a reference fingerprint image template. If the live fingerprint image template matches with the reference fingerprint image template, the processing unit 104 may conclude that the user whose fingerprint is being sensed is authentic. Furthermore, the fingerprint image sensor 102 may be configured to merge individual pixels in the analog domain and to provide merged pixels to the processing unit 104, instead of or in addition to individual pixels. It is noted that the term "pixel" as used herein refers to a basic element of a fingerprint image, as captured by an individual component of the sensor 102 (e.g., an individual sensor plate), and that the dimensions of a pixel may vary in dependence on the application and the technology used. In accordance with the present disclosure, the processing unit 104 may also be configured to process merged pixel values, instead or in addition to individual pixel values. In one or more embodiments, processing the individual pixels and merged pixels comprises digital processing. If the fingerprint image sensor 102 and processing unit 104 capture and process, respectively, only individual pixels, the highest possible resolution is achieved. If the fingerprint image sensor 102 and processing 104 capture and process, respectively, merged pixels of at least a part of the fingerprint image, a lower resolution is achieved.

It is noted that the fingerprint verification device 100 may be configured to support a plurality of different low resolution modes: the resolution depends on the number of neighboring pixels that is merged into a single pixel value. Thus, in one or more embodiments, the fingerprint verification device 100 is configured to operate in a plurality of different second resolution modes. In particular, the resolutions corresponding to the different second resolution modes are different from each other. In this way, the level of confidence of a fingerprint match may gradually be increased by incrementally increasing the resolution for selected areas, while still saving power and resources. This process will be explained in more detail below.

Figure 2:
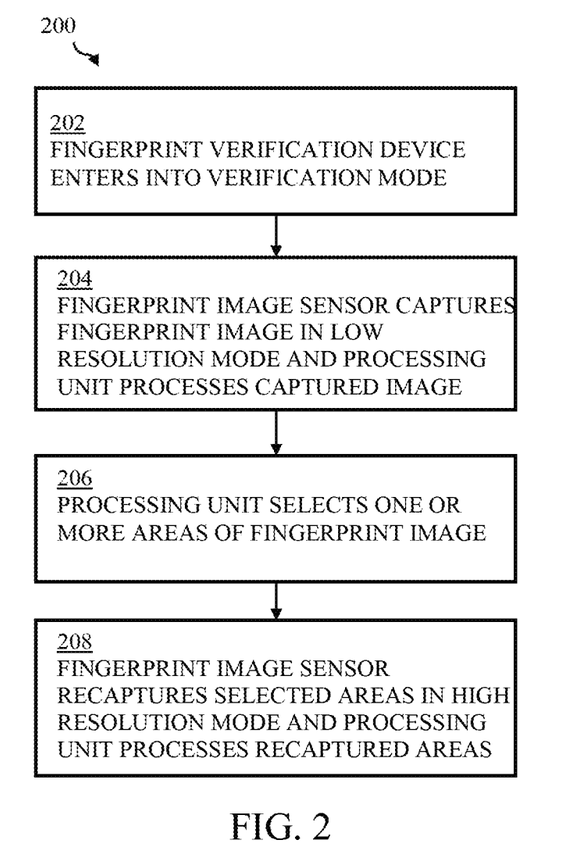
FIG. 2 shows an illustrative embodiment of a method of operation in a verification mode.

FIG. 2 shows an illustrative embodiment of a method of operation 200 in a verification mode. In particular, it shows how the fingerprint verification device 100 shown in FIG. 1 may operate when a user should be authenticated. The method 200 comprises the following steps. At 202, the fingerprint verification device 100 enters into the verification mode. At 204, the fingerprint image sensor 102 captures a fingerprint image in the low resolution mode and the processing unit 104 processes the captured image. More specifically, the fingerprint image sensor 102 may capture merged pixels and provide merged pixels to the processing unit 104. Subsequently, the processing unit 104 may process the merged pixels. At 206, the processing unit 104 selects one or more areas of the fingerprint image. In a practical and efficient implementation, the areas are selected by identifying fingerprint features in the fingerprint image and by defining said areas around those features. In a practical and efficient implementation, the fingerprint features comprise fingerprint minutiae. Furthermore, at 208, the fingerprint image sensor 102 recaptures the selected areas in the high resolution mode and the processing unit 104 processes the recaptured areas. In a practical and efficient implementation, the processing unit 104 may instruct the fingerprint image sensor 102 to recapture the selected areas in the high resolution mode, or instruct a separate controller (not shown) to set the fingerprint image sensor 102 to the high resolution mode and to initiate the recapturing of the selected areas. It is noted that the terms "capture" and "recapture" refer to the process of transforming measured physical properties of a fingerprint sensor (e.g., capacitances present on one or more sensor plates) into signals or values that represent individual pixels or merged pixels of a fingerprint image. Furthermore, the term "process" refers to performing functions on those signals or values, for example digital signal processing functions.

In one or more embodiments, the fingerprint verification device 100 is further configured to operate in an enrollment mode in which the fingerprint image sensor captures a reference fingerprint image in the first resolution mode and the processing unit processes the captured reference fingerprint image. In this way, since the reference fingerprint image—i.e. the image against which live candidates are matched when a user is being authenticated—is captured and processed with a high resolution, the reliability of the fingerprint verification process may be increased. Furthermore, in one or more embodiments, in said enrollment mode, the fingerprint image sensor 102 is further configured to capture a plurality of reference fingerprint images in the first resolution mode, and the processing unit 104 is configured to merge said reference fingerprint images into a single image. In this way, the quality of the obtained reference fingerprint image may be increased. In particular, the noise that is present in the individual reference fingerprint images may be filtered out.

Figure 3:
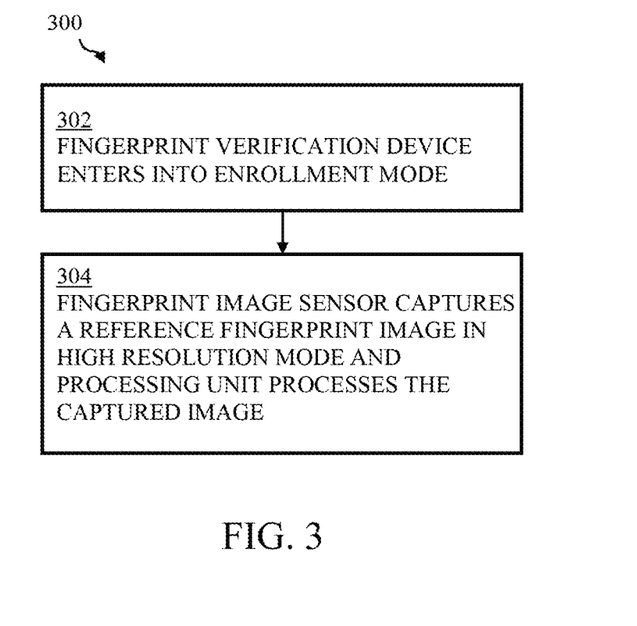
FIG. 3 shows an illustrative embodiment of a method of operation in an enrollment mode.

FIG. 3 shows an illustrative embodiment of a method of operation 300 in an enrollment mode. In particular, it shows how the fingerprint verification device 100 shown in FIG. 1 may operate when a new user should be enrolled. In order to enable authentication of a user, the user should be enrolled to the fingerprint verification device 100. The method 300 comprises the following steps. At 302, the fingerprint verification device 100 enters into the enrollment mode. Then, at 304, the fingerprint image sensor 102 captures a reference fingerprint image in the high resolution mode and the processing unit 104 processes the captured image. Subsequently, the reference fingerprint image may be stored (not shown) in a storage unit of the fingerprint verification device 100, so that live candidates can be matched against it.

Thus, the presently disclosed device and method are based on an approach that makes use of high resolution and low resolution captures at various stages from enrollment to verification. Thereby, a fast verification process may be realized, that does not require excessive computational resources and power and yet does not result in high FARs and FRRs. At the enrollment stage, a high resolution fingerprint image is captured, in order to determine the coordinates of and/or spatial relationship among various features of a fingerprint. Additionally, a low resolution image can be used at the enrollment stage, in order to filter out false or fake features of a fingerprint, or in order to carry out other image enhancements. At the verification stage, the matching process starts with a low resolution image of a live sample, and on an on-need basis, a high resolution may be captured in desired areas or windows. Low resolution fingerprint capturing and matching requires less computational resources than a high resolution fingerprint matching. In particular, the digital processing of individual pixel signals or values is resource-consuming. The digital processing of merged pixel signals or values requires less computational resources, but it may result in higher FARs and FRRs. Therefore, in areas or windows of interest, a high resolution capturing and matching is performed.

In one or more embodiments, in the first resolution mode, the fingerprint image sensor is configured to capture individual pixels of a fingerprint image and the processing unit is configured to process the captured individual pixels, and in the second resolution mode, the fingerprint image sensor is configured to capture merged pixels of the fingerprint image and the processing unit is configured to process the captured merged pixels. That is to say, in a practical and efficient implementation, a multi-resolution fingerprint sensor is used where in one mode (high resolution mode) all pixels are read with smallest resolution (e.g., 500 dpi) whereas in another mode (low resolution mode) neighboring pixels are merged together into super pixels, thereby reducing the overall resolution of capture.

Figure 4:
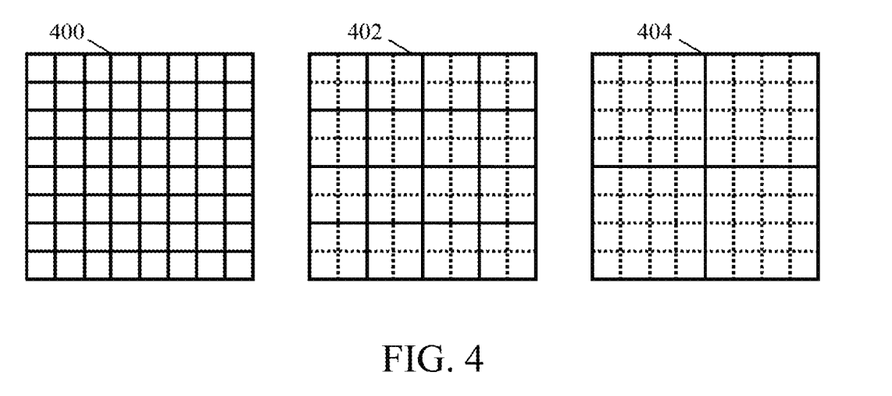
FIG. 4 shows an example of different resolution modes.

FIG. 4 shows an example of different resolution modes 400, 402, 404. In particular, a first resolution mode 400 (high resolution mode) is shown, as well as two second resolution modes 402, 404 (low resolution modes). It is noted that the two second resolution modes 402, 404 are different in that the resolution in mode 402 is higher than the resolution in mode 404. The example shows a sensor array of 8×8 pixels in high resolution mode 400. In resolution mode 402, 4 neighboring pixels are merged into a single super pixel, resulting in a 4×4 sensor array. In resolution mode 404, 16 neighboring pixels are merged into a single super pixel, resulting in a 2×2 sensor array. Other ratios (not shown) can be used as well, such as merging 9 neighboring pixels into a single super pixel. In the low resolution mode, the neighboring pixels may be merged at the time of sensing, i.e. in the analog domain before feeding them to an analog-to-digital converter, in order to realize a fast and efficient implementation.

Figure 5:
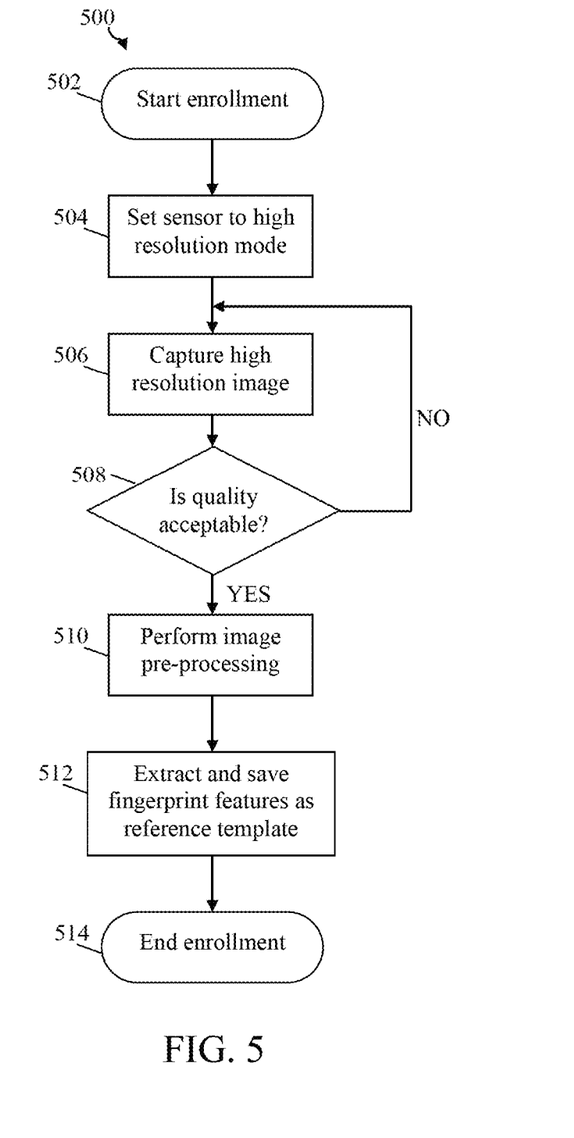
FIG. 5 shows another illustrative embodiment of a method of operation in the enrollment mode.

FIG. 5 shows another illustrative embodiment of a method of operation 500 in the enrollment mode. In particular, it shows a more detailed practical implementation of the method of operation 300 shown in FIG. 3. The enrollment process (i.e. reference fingerprint template creation) is usually done only once, when a new authorized user is enrolled. The reference fingerprint template creation is a critical step that will affect each and every fingerprint match request; therefore this step should have a low error margin. Since this is usually a one-time process the user is flexible to spend a couple of seconds or even tens of seconds for enrollment. Therefore, the following steps may be performed. At 502, the enrollment process starts. Then, at 504, the fingerprint verification device's fingerprint image sensor ("sensor", in short) is set to the high resolution mode. At 506, a finger is presented and a high resolution fingerprint image is captured. Then, at 508, the quality of the captured fingerprint image is checked. For example, the noise levels in the captured fingerprint image may be analyzed. If the noise levels are too high (i.e., the quality is not sufficient) the sensor may perform step 506 again. Steps 508 and 506 may be repeated until a fingerprint image of sufficient quality is obtained. Thus, one or more additional fingerprint images may be captured and merged into a single image, in order to filter random noise. In addition, it may be checked whether the finger has moved when the additional images were captured, and if it has moved significantly, the enrollment process may have to be restarted. In case of a memory-limited system, if multiple image captures (i.e., scans) cannot be handled, then one of the following approaches may be used: a) read one pixel multiple times before providing a merged value; b) read a group of a few pixels two or more times, and merge for each pixel the respective pixel from each scan to get a noise-mitigated value for each pixel in the group, then move to the next group of pixels. At 510, the captured fingerprint image may be preprocessed. Examples of pre-processing functions are binarization (converting a grayscale image to a black-and-white image) and thinning (reducing the thickness of lines to one pixel width). Such pre-processing functions facilitate the next steps, for example feature extraction. At 512, the fingerprint features (e.g., fingerprint minutiae and their properties) that will be used in fingerprint matching algorithms may be extracted from the pre-processed fingerprint image. The extracted fingerprint features and their absolute and/or relative properties may be stored in the form of reference fingerprint template. The full image data used in the enrollment process may then be discarded. At 514, the enrollment process ends.

A typical set of fingerprint features which may be compared between a reference fingerprint template and a live candidate comprises fingerprint minutiae. Specifically, the features comprise the type of minutia (e.g., ridge ending, bifurcation) and the relative Euclidean distance between minutiae. The skilled person will appreciate that other types of fingerprint features may be used as well. Furthermore, an actual implementation may include more or different characteristics of a fingerprint. In a non-limiting example, minutiae with the following properties as matching parameters may be used:

Type of minutia, t
  Coordinates of minutia, x and y
  Orientation of minutia, $\theta$ During authentication of a user, a fingerprint matching algorithm may compare the relative Euclidean distance and relative orientation among minutiae in the reference fingerprint template with similar parameters in a live candidate (i.e., a fingerprint image captured in a verification mode). If the difference is within an acceptable margin (referred to as tolerance box) then the presented live candidate may be considered as a match.

For a reference template which has two minutia, A $\{x_A, y_A, \theta_A\}$ and B $\{x_B, y_B, \theta_B\}$, the relative orientation can be specified as:

$$D_r = \sqrt{(x_A - x_B)^2 + (y_A - y_B)^2}$$

$$\alpha_r = \theta_A - \theta_B$$

Similarly, for a live candidate that has two minutiae, L and M, the relative orientation can be specified as:

$$D_c = \sqrt{(x_L - x_M)^2 + (y_L - y_M)^2}$$

$$\alpha_c = \theta_L - \theta_M$$

In this example, the live candidate is considered a match if both of the following conditions are met:

$$|D_r - D_c| \leq T_D$$

$$\min(|\alpha_r - \alpha_c|, 360 - |\alpha_r - \alpha_c|) \leq T_\alpha$$

Here $T_D$ and $T_\alpha$ are the tolerance boxes for distance and angle. If the value of the tolerance boxes is too high, the FAR might be too high, whereas if the value of the tolerance boxes is too low, the FRR might be too high. The values of tolerance boxes are often obtained from various trials on sample fingerprints in order to produce an optimal value, but they are fixed for a system in operation. As mentioned above, the parameters distance and angle merely represent examples.

Figure 6:
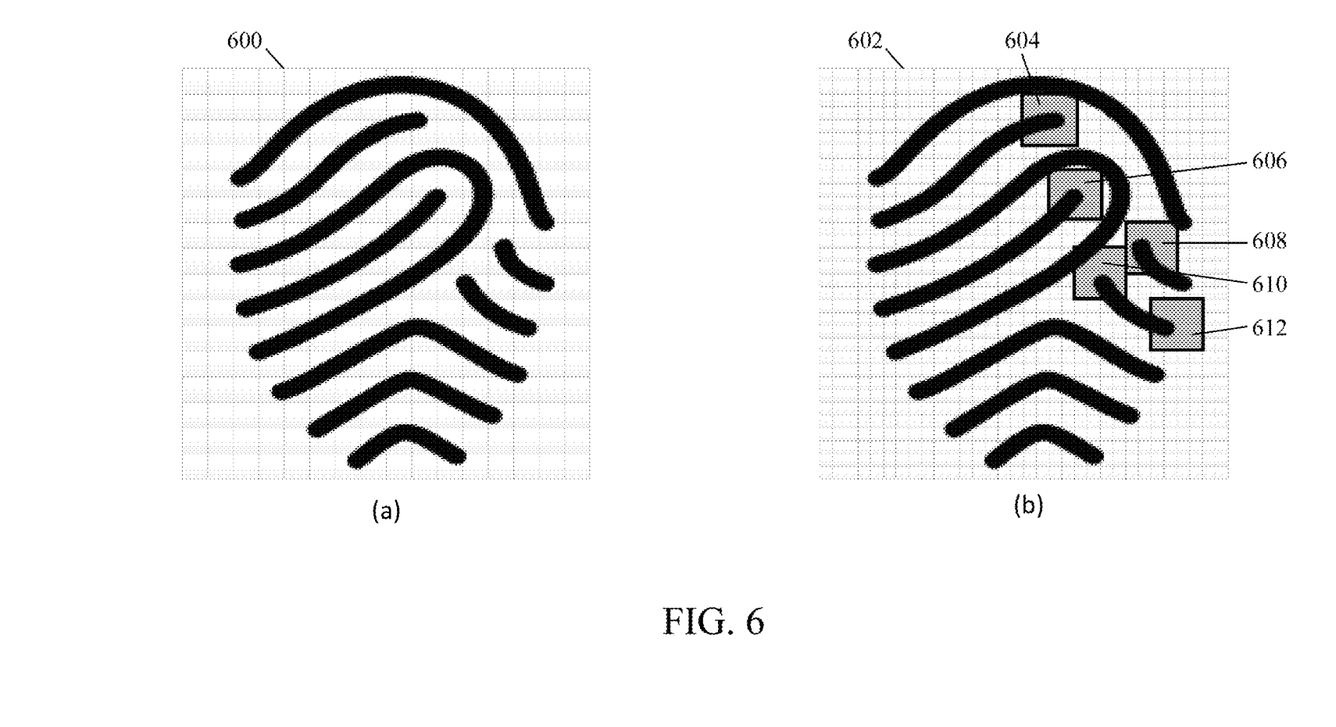
FIG. 6 shows an example of selected areas in a fingerprint image.

FIG. 6 shows an example of selected areas 604, 606, 608, 610, 612 in a fingerprint image. In particular, it shows how, when operating in the verification mode, the processing unit selects areas to be recaptured and reprocessed in the high resolution mode. As mentioned before, when operating in the verification mode, the fingerprint image sensor captures a fingerprint image in the second resolution mode 600 (low resolution mode) and the processing unit processes the captured image. Subsequently, the processing unit 104 selects one or more areas 604, 606, 608, 610, 612 of the fingerprint image. Then, the fingerprint image sensor recaptures the selected areas 604, 606, 608, 610, 612 in the first resolution mode 602 (high resolution mode) and the processing unit processes the captured selected areas.

Figure 7:
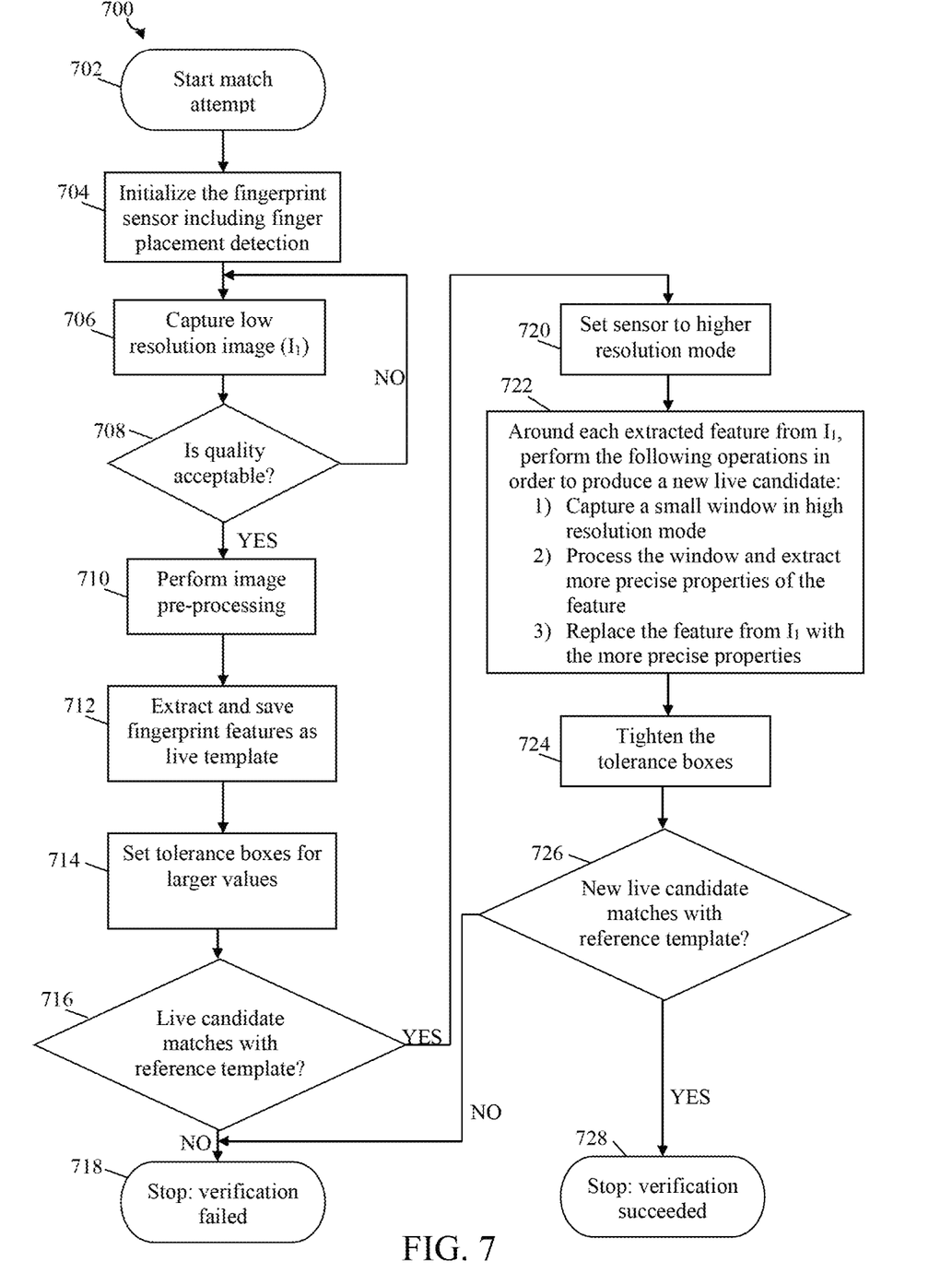
FIG. 7 shows another illustrative embodiment of a method of operation in the verification mode.

FIG. 7 shows another illustrative embodiment of a method of operation 700 in the verification mode. In particular, it shows a more detailed practical implementation of the method of operation 200 shown in FIG. 2. Specifically, the following steps may be performed. At 702, a fingerprint match attempt is started. Subsequently, a low resolution fingerprint image ($I_1$) is captured at 706. The quality of the low resolution image is checked at 708. If the quality is not acceptable, one or more additional low resolution images may be captured and merged into a single image. If the quality is acceptable, the image may be pre-processed at 710. Thus, a low resolution image of a live candidate is captured. This low resolution image is fed to a fingerprint feature extraction algorithm at 712. The extracted fingerprint features (e.g., the properties of identified minutiae) are recorded and a match request is triggered with relatively large tolerance boxes (which have been set in step 714). At 716, it is checked whether the low resolution image of the live candidate matches with the reference fingerprint template. If it does not match, the process stops at 718 because the verification has failed (i.e., the user is deemed not to be authentic). Since this verification is done with a low resolution image and large tolerance boxes, a very clear and obvious mismatch can be detected much faster than with existing methods. If the low resolution image of the live candidate matches with the reference fingerprint template, the sensor is set to a higher resolution mode at 720. At 722, a high resolution image of the live candidate is fetched at points of interest (selected areas) of the low resolution image. This is referred to in FIG. 7 as producing a new live candidate. Specifically, around each extracted fingerprint feature from $I_1$, the following operations are performed in order to produce a new live candidate: 1) capture a small window (i.e. a selected area) in high resolution mode; 2) process the window and extract more precise properties of the fingerprint feature; 3) replace the feature from $I_1$ with the more precise properties. Since these operations are performed only in small windows of the full fingerprint image the processing times and resource requirements remain acceptable. Then, a match request may be triggered with small tolerance boxes (which have been reduced or tightened so to minimize the FAR in step 724). At 726, it is checked whether the high resolution image of the new live candidate matches with the reference fingerprint template. If it does not match, the process stops at 718 because the verification has failed (i.e., the user is deemed not to be authentic). If it matches, the process stops at 728 because the verification has succeeded (i.e., the user is deemed to be authentic). Thus, in one or more embodiments, processing the captured fingerprint image and processing the recaptured selected areas comprises matching said fingerprint image and selected areas against reference data, and the processing unit is further configured to use smaller tolerance boxes for matching the selected areas than for matching the fingerprint image. In this way, the FAR may be reduced while processing times and resource requirements remain acceptable. In case the fingerprint verification device is configured to operate in a plurality of different second resolution modes, the tolerance boxes may be reduced iteratively, as explained below. In this way, the FAR may be further reduced while processing times and resource requirements still remain acceptable.

As mentioned above, the fingerprint verification device may be configured to operate in a plurality of different second resolution modes (low resolution modes). In this way, the level of confidence of a fingerprint match may gradually be increased while still saving power and resources. In the present example, if the fingerprint verification device supports more than two resolutions, then steps 720 to 726 can be performed iteratively (not shown), specifically by increasing the resolution and reducing the tolerance box for each successive iteration. Once step 720 is entered the confidence score achieved with image (i.e., the image captured and processed at the lowest resolution) may be ignored because it is superseded with more precise minutia properties. The outcome after looping though the applicable iteration is a positive or negative match result. In case of a negative match result, the process may stop at 718 because the verification failed. In case of a positive match result, a new iteration (i.e. at higher resolution) may be performed or the process may stop at 728 because the verification succeeded.

The systems and methods described herein may at least partly be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, nonvolatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 fingerprint verification device
102 fingerprint image sensor
104 processing unit
200 operation in verification mode
202 fingerprint verification device enters into verification mode
204 fingerprint image sensor captures fingerprint image in low resolution mode and processing unit processes captured image
206 processing unit selects one or more areas of fingerprint image
208 fingerprint image sensor recaptures selected areas in high resolution mode and processing unit processes recaptured areas 300 operation in enrollment mode
302 fingerprint verification device enters into enrollment mode
304 fingerprint image sensor captures a reference fingerprint image in high resolution mode and processing unit processes the captured image
400 high resolution mode
402 low resolution mode
404 low resolution mode
500 operation in enrollment mode
502 start enrollment
504 set sensor to high resolution mode
506 capture high resolution image
508 is quality acceptable?
510 perform image pre-processing
512 extract and save fingerprint features as reference template
514 end enrollment
600 low resolution mode
602 high resolution mode
604 selected area
606 selected area
608 selected area
610 selected area
612 selected area
700 operation in verification mode
702 start match attempt
704 initialize the fingerprint sensor including finger placement detection
706 capture low resolution image ($I_1$)
708 is quality acceptable?
710 perform image pre-processing
712 extract and save fingerprint features as live template
714 set tolerance boxes for larger values
716 live candidate matches with reference template?
718 stop: verification failed
720 set sensor to higher resolution mode
722 around each extracted feature from $I_1$, perform the following operations in order to produce a new live candidate: 1) capture a small window in high resolution mode; 2) process the window and extract more precise properties of the feature; 3) replace the feature from with the more precise properties
724 tighten the tolerance boxes
726 new live candidate matches with reference template?
728 stop: verification succeeded

The invention claimed is:

1. A fingerprint verification device comprising a fingerprint image sensor and a processing unit, the fingerprint verification device being configured to operate in a first resolution mode and in a second resolution mode, wherein the first resolution is higher than the second resolution, the fingerprint verification device further being configured to operate in a verification mode in which: the fingerprint image sensor captures a fingerprint image in the second resolution mode and the processing unit processes the captured fingerprint image; the processing unit selects one or more areas of the captured fingerprint image; the fingerprint image sensor recaptures the selected areas in the first resolution mode and the processing unit processes the recaptured selected areas;
wherein the processing unit is configured to select said areas by identifying fingerprint minutiae in said image and by defining said areas around the identified fingerprint minutiae;
wherein processing the fingerprint image captured in the second resolution mode comprises extracting fingerprint minutiae and determining if a match exists between the extracted fingerprint minutiae and a reference template using a first tolerance box; and
wherein processing the recaptured selected areas, which were captured in the first resolution mode, comprises determining if a match exists between fingerprint minutiae in the recaptured selected areas and the reference template using a second tolerance box, wherein the first and second tolerance boxes are a function of relative distance and relative orientation between two minutiae, and wherein the second tolerance box is smaller than the first tolerance box.

2. The fingerprint verification device of claim 1, further being configured to operate in an enrollment mode in which the fingerprint image sensor captures a reference fingerprint image in the first resolution mode and the processing unit processes the captured reference fingerprint image.

3. The fingerprint verification device of claim 2, wherein, in said enrollment mode, the fingerprint image sensor is further configured to capture a plurality of reference fingerprint images in the first resolution mode, and to merge said reference fingerprint images into a single image.

4. The fingerprint verification device of claim 1, further being configured to operate in a plurality of different second resolution modes.

5. The fingerprint verification device of claim 1, wherein, in the first resolution mode, the fingerprint image sensor is configured to capture individual pixels of a fingerprint image and the processing unit is configured to process the captured individual pixels, and in the second resolution mode, the fingerprint image sensor is configured to capture merged pixels of the fingerprint image and the processing unit is configured to process the captured merged pixels, wherein merging pixels comprises merging signals from multiple neighboring pixels into a super pixel.

6. The fingerprint verification device of claim 5, wherein processing the individual pixels and processing the merged pixels comprises digital processing.

7. The fingerprint verification device of claim 1, wherein processing the captured fingerprint image and processing the recaptured selected areas comprises matching said fingerprint image and selected areas against reference data, and wherein the processing unit is further configured to use smaller tolerance boxes for matching the selected areas than for matching the fingerprint image.

8. A smart card comprising the fingerprint verification device of claim 1.

9. The fingerprint verification device of claim 5, wherein merging signals from multiple neighboring pixels into a super pixel comprises merging signals from multiple neighboring pixels in the analog domain at the time of sensing and before feeding the signals from the multiple neighboring pixels into an analog-to-digital converter.

10. A fingerprint verification method using a fingerprint verification device comprising a fingerprint image sensor and a processing unit, the fingerprint verification device being configured to operate in a first resolution mode and in a second resolution mode, wherein the first resolution is higher than the second resolution, wherein, when the fingerprint verification device operates in a verification mode:
the fingerprint image sensor captures a fingerprint image in the second resolution mode and the processing unit processes the captured fingerprint image; the processing unit selects one or more areas of the captured fingerprint image; the fingerprint image sensor recaptures the selected areas in the first resolution mode and the processing unit processes the recaptured selected areas;

wherein the processing unit is configured to select said areas by identifying fingerprint minutiae in said image and by defining said areas around the identified fingerprint minutiae;

wherein processing the fingerprint image captured in the second resolution mode comprises extracting fingerprint minutiae and determining if a match exists between the extracted fingerprint minutiae and a reference template using a first tolerance box; and wherein processing the recaptured selected areas, which were captured in the first resolution mode, comprises determining if a match exists between fingerprint minutiae in the recaptured selected areas and the reference template using a second tolerance box, wherein the first and second tolerance boxes are a function of relative distance and relative orientation between two minutiae, and wherein the second tolerance box is smaller than the first tolerance box.

11. The fingerprint verification method of claim 10, wherein, when the fingerprint verification device operates in an enrollment mode, the fingerprint image sensor captures a reference fingerprint image in the first resolution mode and the processing unit processes the captured reference fingerprint image.

12. The fingerprint verification method of claim 11, wherein, in said enrollment mode, the fingerprint image sensor captures a plurality of reference fingerprint images in the first resolution mode, and merges said reference fingerprint images into a single image.

13. A non-transitory machine-readable medium comprising computer-executable instructions which, when executed, carry out or control a method as claimed in claim 10.

14. The fingerprint verification method of claim 10, wherein, in the first resolution mode, the fingerprint image sensor is configured to capture individual pixels of a fingerprint image and the processing unit is configured to process the captured individual pixels, and in the second resolution mode, the fingerprint image sensor is configured to capture merged pixels of the fingerprint image and the processing unit is configured to process the captured merged pixels, wherein merging pixels comprises merging signals from multiple neighboring pixels into a super pixel.

15. The fingerprint verification method of claim 14, wherein merging signals from multiple neighboring pixels into a super pixel comprises merging signals from multiple neighboring pixels in the analog domain at the time of sensing and before feeding the signals from the multiple neighboring pixels into an analog-to-digital converter.

16. A fingerprint verification method using a fingerprint verification device comprising a fingerprint image sensor and a processing unit, the fingerprint verification device being configured to operate in a first resolution mode and in a second resolution mode, wherein the first resolution is higher than the second resolution, wherein, when the fingerprint verification device operates in a verification mode, the method comprising:

capturing a fingerprint image in the second resolution mode and processing the captured fingerprint image, wherein processing the captured fingerprint image comprises extracting fingerprint minutiae and determining if a match exists between the extracted fingerprint minutiae and a reference template using a first tolerance box;

selecting one or more areas of the captured fingerprint image by identifying fingerprint minutiae in the fingerprint image and by defining said areas around the identified fingerprint minutiae; and recapturing the selected areas in the first resolution mode and processing the recaptured selected areas, wherein processing the recaptured selected areas comprises determining if a match exists between fingerprint minutiae in the recaptured selected areas and the reference template using a second tolerance box;

wherein the first and second tolerance boxes are a function of relative distance and relative orientation between two minutiae, and wherein the second tolerance box is smaller than the first tolerance box.

17. The fingerprint verification method of claim 16, wherein, in the first resolution mode, the fingerprint image sensor is configured to capture individual pixels of a fingerprint image and the processing unit is configured to process the captured individual pixels, and in the second resolution mode, the fingerprint image sensor is configured to capture merged pixels of the fingerprint image and the processing unit is configured to process the captured merged pixels, wherein merging pixels comprises merging signals from multiple neighboring pixels into a super pixel.

18. The fingerprint verification method of claim 17, wherein merging signals from multiple neighboring pixels into a super pixel comprises merging signals from multiple neighboring pixels in the analog domain at the time of sensing and before feeding the signals from the multiple neighboring pixels into an analog-to-digital converter.

* * * * *